Patented Oct. 27, 1931

1,829,539

UNITED STATES PATENT OFFICE

CARL F. PRUTTON, OF CLEVELAND, OHIO, ASSIGNOR TO THE DOW CHEMICAL COMPANY, OF MIDLAND, MICHIGAN, A CORPORATION OF MICHIGAN

METHOD OF TREATING BRINE

No Drawing.   Application filed September 4, 1928.   Serial No. 303,839½.

The present invention relates to methods of working up mixed brines containing magnesium chloride and calcium chloride for the separation of said chlorides in hydrated form and is, in general, applicable to working up solutions of said chlorides containing same in any ratio, and further applicable to the working up of natural brines containing said chlorides together with common salt (NaCl). Specifically, the process is one for the separation of magnesium chloride and calcium chloride from mixed solutions thereof in the form of magnesium chloride dodecahydrate ($MgCl_2.12H_2O$) and calcium chloride hexahydrate ($CaCl_2.6H_2O$) and provides a method whereby either of said hydrated chlorides may be separated by crystallizing from such mixed solutions.

To the accomplishment of the foregoing and related ends, the invention, then, consists of the steps hereinafter fully described and particularly pointed out in the claims, the following description setting forth in detail two modes of carrying out the invention, such disclosed modes, illustrating, however, but several of the various ways in which the principle of the invention may be used.

The method depends, for its operation, upon the phenomena of fractional crystallization from solutions saturated with respect to either of the said hydrated chlorides.

The exact sequence of operations will vary, depending upon the ratio of $MgCl_2$ to $CaCl_2$ in the mixed solutions from which the hydrated chlorides are to be separated. Given a solution in which the magnesium chloride is in large excess, the first crystallization may be that of $MgCl_2.12H_2O$. Given, however, a solution in which $CaCl_2$ largely predominates, the first crystallization may be that of $CaCl_2.6H_2O$. In the first instance a later crystallization will be that of $CaCl_2.6H_2O$ followed by a repetition of the crystallization of $MgCl_2.12H_2O$. In the latter, the later crystallization will be that of $MgCl_2.12H_2O$ followed by repetition of the crystallization of $CaCl_2.6H_2O$. For certain brines in which the ratio of $MgCl_2$ to $CaCl_2$ is intermediate, it will be optional which crystallization shall be done first. Economic process considerations will govern, but, in general, the process comprises a series of repeated alternate crystallizations of magnesium chloride dodecahydrate, and calcium chloride hexahydrate, which one shall be first crystallized depending, as above pointed out, upon the composition of the original solution.

In the case of brines containing other ingredients than magnesium and calcium chlorides, preliminary steps will be required to separate these other ingredients such as, for instance, NaCl, which may be done by preliminary concentration employing evaporation either at atmospheric or reduced pressure, in single or in multiple effect.

To illustrate the working of my improved process, I will first describe in Example I the working up of a mixed chloride solution such as may be derived from the natural salt brines of the Midland, Michigan, district, in which the $$\frac{MgCl_2}{CaCl_2}$$

ratio is approximately ⅓ by weight, and later, in Example II the working up of a brine in which the magnesium chloride content is in excess of the calcium chloride content.

Example I

This example illustrates my improved method as applied to the working up of a brine in which the $$\frac{MgCl_2}{CaCl_2}$$

ratio is approximately $$\frac{11.1}{33.3}$$

by weight, such as is characteristic of brines in the Midland, Michigan, district.

*Step I.*—Concentrate 40° Bé. mixed magnesium chloride, calcium chloride brine, obtained as a mother liquor after separation of the salt (NaCl) content and containing 28.5% $CaCl_2$, 9.5% $MgCl_2$, and 62% $H_2O$, by evaporation, preferably under vacuum, to a composition of 33.3% $CaCl_2$, 11.1% $MgCl_2$ and 55.6% $H_2O$. This composition is that of a solution which, when cooled to 0° C., is saturated with respect to $CaCl_2.6H_2O$ and short of saturation with respect to $MgCl_2.6H_2O$.

*Step II.*—The solution from Step I is then cooled, preferably in a mechanical crystallizer, to 0° C., whereupon there will be salted out crystals of $CaCl_2.6H_2O$ containing 50.7% $CaCl_2$, 49.3% $H_2O$, which will be suspended in a mother liquor containing 13.8% $CaCl_2$, 23.8% $MgCl_2$, and 62.4% $H_2O$.

*Step III.*—The crystal slurry comprising the hexahydrate, $CaCl_2.6H_2O$, and the mother liquor from Step II is then preferably run to a filter tank or equivalent in which the mother liquor is drained off under suction and in which the $CaCl_2.6H_2O$ crystals are afterward washed with cold water to displace the mother liquor containing $MgCl_2$.

*Step III A.*—The $CaCl_2.6H_2O$ crystals after washing, in Step III, substantially free of $MgCl_2$ may be used as such or they may be preferably melted in situ as by heating by means of steam coils in a suitable pan or kettle and the calcium chloride solution so obtained, having an estimated analysis of 42% $CaCl_2$, 58% $H_2O$, may then be concentrated by evaporation if desired and finished in the usual manner, as for instance, to produce flaked, hydrated calcium chloride approximating the composition $CaCl_2.2H_2O$ or by further dehydration in a dryer to a form containing even a lower percentage of crystal water, e. g., anhydrous $CaCl_2$.

*Step IV.*—The mother liquor from Step III, which, if no wash water were added thereto, would contain 13.8% $CaCl_2$, 23.8% $MgCl_2$, and 62.4% $H_2O$, will then be diluted to have a composition of 12%, $CaCl_2$, 20.7% $MgCl_2$.

*Step V.*—The diluted solution obtained in Step IV is then cooled to a temperature of −30° C., seeding with crystals of magnesium chloride dodecahydrate, so that the magnesium chloride will separate in that form. There is obtained a slurry of dodecahydrate crystals and a mother liquor having a composition of approximately 8.7% $MgCl_2$, 22.5% $CaCl_2$, and 68.8% $H_2O$.

*Step VI.*—The crystal slurry obtained in Step V will then be separated as by filtration and the mother liquor will be added to a solution which has preferably been derived from the original brine and which has been concentrated to about 13% $MgCl_2$ and 39% $CaCl_2$. The concentration of the brine to which the mother liquor is added and the amount thereof must be correct to give a concentration of the mixture suitable for use in Step II. The temperature of the mixture resulting from the said addition will probably be somewhat above 0° C. to which temperature it would then be cooled, thus conserving the refrigeration which has been expended upon the solution in Step V.

*Step VII.*—The dodecahydrate crystals obtained from Step VI may be washed and used as such or melted to form a solution of magnesium chloride which also may be used as such or may be finished as desired, as by concentration and/or further dehydration to produce any of the desired forms of the hydrated chloride or the anhydrous salt.

In this description of my improved method of operation I have specified a temperature of 0° C. as that to which a solution will be cooled to salt out $CaCl_2.6H_2O$. It should be understood, however, that it is possible to concentrate the brine to any of a series of compositions which when cooled to temperatures lying between 22° C. and −30° C., such solution will be saturated with $CaCl_2.6H_2O$ which will salt out therefrom and the mother liquor obtained will be short of saturation with $MgCl_2.6H_2O$. At temperatures between −6.7° C. and −20.7° C., $MgCl_2.8H_2O$ is a stable hydrate of $MgCl_2$ in equilibrium with solutions saturated with $CaCl_2.6H_2O$, but such $MgCl_2.8H_2O$ does not spontaneously or easily crystallize from these solutions at temperatures as low as −20° C., so that it is possible to cool the solution from which the $CaCl_2.6H_2O$ is salted out to a temperature and mother liquor concentration which is just short of saturation with $MgCl_2.6H_2O$ without encountering any trouble due to the salting out of the $MgCl_2.8H_2O$ which would, if it occurred, contaminate the $CaCl_2.6H_2O$ crystal product of that step.

Example II

In this example, my improved method is applied to the working up of a brine (or solution) in which the ratio of magnesium chloride to calcium chloride is 75 to 25 parts by weight. If this brine contains other salts, such as NaCl, they will first be separated in the usual manner leaving a solution containing essentially calcium chloride, magnesium chloride and water, and of the character above stated.

*Step I.*—Bring the concentration of the solution to 23.4% $MgCl_2$, 7.8% $CaCl_2$ and 68.8% water. This can be accomplished either by concentration or dilution from the solution obtained in the preliminary separation of other salts. The composition of this solution is such, that on cooling to −30° C. (or the desired low temperature which can lie between −20.7 and −52.0° C.) and seeding with crystals of magnesium chloride dodecahydrate, a mixture of $MgCl_2.12H_2O$ crystals and a solution saturated with this hydrate and short of saturation with $CaCl_2.6H_2O$, is obtained.

*Step II.*—Cool solution from Step I to −30° C., and seed with crystals of $MgCl_2.12H_2O$. This yields a slurry of crystals of the dodecahydrate of magnesium chloride suspended in a mother liquor containing 8.7% $MgCl_2$ 22.5% $CaCl_2$ and 68.8% water.

*Step III.*—The crystal slurry from Step II, comprising magnesium chloride dodecahydrate crystals and mother liquor, is run preferably to a filter tank or equivalent, wherein the mother liquor is drained away by suction and the dodecahydrate crystals remaining on the filter may be washed with water to displace mother liquor adhering thereto, and containing calcium chloride. The washed dodecahydrate may then be converted (as mentioned in Step VII of Example I) into the desired final product.

*Step IV.*—The mother liquor with washings from Step III is concentrated to a composition which when cooled to 0° C. will yield a mixture of calcium chloride hexahydrate crystals and a solution saturated with this hydrate and short of saturation with magnesium chloride hexahydrate. If the mother liquor alone were used for this step, the composition before cooling would be 31.0% $CaCl_2$, 12.0% $MgCl_2$ and 57.0% $H_2O$.

*Step V.*—The concentrated solution from Step IV is cooled to 0° C., yielding crystals of calcium chloride hexahydrate and a solution saturated with this solid and short of saturation with magnesium chloride hexahydrate. In this step it should be noted that the temperature of cooling can vary from 22 degrees to $-30$ degrees C. The composition of solution previous to cooling must be such that when cooled to the desired low temperature a mixture of calcium chloride hexahydrate crystals and a solution saturated with that hydrate but unsaturated with magnesium chloride hexahydrate, is obtained.

*Step VI.*—The slurry from Step V, comprising calcium chloride hexahydrate crystals and mother liquor, is run preferably to a filter tank or equivalent, wherein the mother liquor is drained away by suction and the calcium chloride hexahydrate crystals remaining on the filter may be washed with water to displace mother liquor adhering thereto, and containing magnesium chloride. The washed calcium chloride hexahydrate crystals may then be converted, as previously mentioned, into the desired final product.

*Step VII.*—The mother liquor with washings from Step VI is mixed with original brine (that is brine from which other salts have been removed) and brought to a composition which will yield on cooling to $-30°$ C. and seeding with magnesium chloride dodecahydrate crystals, a mixture of dodecahydrate crystals and a solution saturated with dodecahydrate and short of saturation with calcium chloride hexahydrate.

This solution is then ready to be cooled as in Step I.

If the mother liquor were used from Step VI and mixed with six times its weight of brine that had been concentrated to 22.1% $MgCl_2$, 7.4% $CaCl_2$ and 70.5% water, the resulting mixture would have the correct composition for cooling as in Step I.

Seeding with magnesium chloride dodecahydrate is usually essential for rapid separation of this hydrate from solution, and is specified simply to insure crystallization within a reasonable time.

In the examples given $MgCl_2.12H_2O$ is crystallized out of solutions containing magnesium chloride in excess over calcium chloride. If the ratio of magnesium chloride to calcium chloride exceeds 70 to 30 parts by weight, then it is possible to crystallize out magnesium chloride octahydrate, by cooling solutions of the correct composition and seeding with crystals of the octa- or dodecahydrate, which causes crystals of the octa-hydrate to separate. The temperature range for this separation is $-6.7$ to $-20.7°$ C. The separation effected by this crystallization is poor as only the magnesium chloride in excess above the 70:30 ratio crystallizes out under the best conditions. In other words, the mother liquor obtained is still high in magnesium chloride.

Although, in general, magnesium chloride dodecahydrate will be separated from solutions in which the magnesium chloride predominates, yet it should be noted that by cooling to $-51°$ C., a solution containing 9 parts $CaCl_2$ to 1 part $MgCl_2$ by weight, the dodecahydrate will first separate.

In the cooling of solutions to produce $CaCl_2.6H_2O$, substantially as described, the cooling to a temperature of 25° C. or 30° C. may be done with water from similar sources preferably, in the jackets of the crystallizers. The cooling from 25° C. down to 0° C. may require mechanical refrigeration unless the process were being operated in a cold climate. Considerable economy of the refrigeration requirement may be realized by using the cold filtrate and cold washings from the step in which $CaCl_2.6H_2O$ is being filtered and washed to cool incoming liquor from which $CaCl_2.6H_2O$ is being salted out. A further economy of the refrigeration requirement may be realized by adding to the washed $CaCl_2.6H_2O$ crystals just sufficient water to dissolve them. The solution takes place with a considerable absorption of heat and the cold solution thereby obtained may be used in the jackets of the crystallizers in a counter-current manner to cool the additional solution. Such a procedure would obviously increase the amount of water to be removed from the purified $CaCl_2$ for the production of the di-hydrate, for instance. The cost of that additional evaporation would be offset, in whole or in part, or in some cases more than offset, by the economy realized in the refrigeration step.

The crystallization of $CaCl_2.6H_2O$ in a mother liquor saturated therewith, and short of saturation with $MgCl_2.6H_2O$ as indicated in Step II of Example I and Step V, Example II, is applicable to solutions of calcium chloride and magnesium chloride in which the ratio by weight of $$\frac{CaCl_2}{MgCl_2}$$

is greater than $$\frac{16.3}{83.7}$$

if the cooling of solutions of lowest said ratio be carried to $-30°$ C.

Working with solutions in which the ratio of $$\frac{CaCl_2}{MgCl_2}$$

is less than $$\frac{25}{75}$$

the sequence of operations will be in accordance with that given in Example II.

Working with solutions in which the like ratio is greater than $$\frac{75}{25}$$

the sequence of operations will be in accordance with Example I.

Working with solutions of intermediate compositions, the sequence of operations will be in accordance with that given either in Example I or Example II as herein before indicated.

Variations in compositions of solutions being cooled for the purpose of separating the hydrated chlorides and preferred temperatures therefor will vary with the composition of the solution being worked.

Economies of refrigeration may, in general be realized by bringing the cold products into heat exchange relation with solutions to be cooled or, in some cases, as instanced in Step VI of Example I, by mixing cool mother liquors with solutions to be treated where such mixing is in line with the process. Application of heat transmission protective coverings, where such will conserve cooling already secured, will be obvious to any one skilled in the art and such applications will effect further economies in the refrigeration requirements of the process.

Other modes of applying the principle of my invention may be employed instead of those explained, change being made as regards the process herein disclosed, provided the step or steps stated by any of the following claims or the equivalent of such stated step or steps employed.

I therefore particularly point out and distinctly claim as my invention:—

1. The method of separating magnesium chloride and calcium chloride from mixed solutions thereof, which comprises the steps of separating the magnesium chloride as dodecahydrate crystals at temperatures between $-20.7°$ C. and $-52°$ C., and separating the calcium chloride as hexahydrate crystals from solutions in which it predominates by cooling to a temperature between $22°$ C. and $-30°$ C.

2. The method of separating magnesium chloride from a mixed solution thereof with calcium chloride, which comprises separating said magnesium chloride as crystals of octahydrate at temperatures from $-6.7°$ C. to $-20.7°$ C.

3. The method of separating magnesium chloride from a mixed solution thereof with calcium chloride, which comprises separating said magnesium chloride as crystals of dodecahydrate at temperatures between $-20.7°$ C. and $-52°$ C.

4. The method of seprating magnesium chloride from a mixed solution thereof with calcium chloride in which solutions the ratio of $MgCl_2$ to $CaCl_2$ by weight is greater than 70 to 30, which comprises cooling said solution to a temperature between $-6.7°$ C. and $-20.7°$ C.

5. The method of separating magnesium chloride and calcium chloride from mixed solutions thereof, which comprises separating magnesium chloride as $MgCl_2.12H_2O$ crystals in a mother liquor saturated therewith at a temperature between $-20.7°$ and $-52°$ C. but unsaturated with $CaCl_2.6H_2O$, separating calcium chloride at $CaCl_2.6H_2O$ crystals in a mother liquor saturated therewith at a temperature between $-30°$ and $22°$ C. but unsaturated with $MgCl_2.6H_2O$, separating the crystals so obtained from their respective mother liquors and recycling the mother liquors.

6. The method of separating magnesium chloride and calcium chloride from mixed solutions thereof, which comprises separating magnesium chloride as $MgCl_2.12H_2O$ crystals in a mother liquor saturated therewith at a temperature between $-20.7°$ and $-52°$ C. but unsaturated with $CaCl_2.6H_2O$, separating calcium chloride as $CaCl_2.6H_2O$ crystals in a mother liquor saturated therewith at a temperature between $-30°$ and $22°$ C. but unsaturated with $MgCl_2.6H_2O$, separating the crystals so obtained from their respective mother liquors, recycling the mother liquors and cooling the solutions to be crystallized by passing same in heat exchange relation with the cold mother liquors.

7. In a method of separating magnesium chloride and calcium chloride from mixed solutions thereof in which the proportion of magnesium chloride is in excess of that of calcium chloride, the steps which consist in concentrating such solution to the point that when cooled to a temperature between $-20.7°$ and $-52°$ C. crystals of $MgCl_2.12H_2O$ will salt out in a mother liquor saturated therewith but unsaturated with $CaCl_2.6H_2O$, cooling such solution to a temperature between $-20.7°$ and $-52°$ C. and separating the crystals thereby formed from the mother liquor.

8. In a method of separating magnesium chloride and calcium chloride from mixed solutions thereof in which the proportion of magnesium chloride is in excess of that of calcium chloride, the steps which consist in concentrating the solution to the point that when cooled to a temperature between $-20.7°$ and $-52°$ C. the crystals of $MgCl_2.12H_2O$ will salt out in a mother liquor saturated therewith but unsaturated with $CaCl_2.6H_2O$, cooling such solution to a temperature between $-20.7°$ and $-52°$ C., separating the crystals thereby formed from the mother liquor, concentrating such mother liquor so that when cooled to a temperature between $22°$ C. and $-30°$ C. crystals of $CaCl_2.6H_2O$ will salt out, cooling to a temperature between $22°$ C. and $-30°$ C. and separating the crystals thereby formed.

9. In a method of separating magnesium chloride and calcium chloride from mixed solutions thereof in which the proportion of magnesium chloride is in excess of that of calcium chloride, the steps which consist in concentrating the solution to the point that when cooled to a temperature between $-20.7°$ and $-52°$ C. crystals of $MgCl_2.12H_2O$ will salt out in a mother liquor saturated therewith but unsaturated with $CaCl_2.6H_2O$, cooling such solution to a temperature between $-20.7°$ and $-52°$ C., separating the crystals thereby formed from the mother liquor, concentrating such mother liquor so that when cooled to a temperature between $22°$ C. and $-30°$ C. crystals of $CaCl_2.6H_2O$ will salt out, cooling to a temperature between $22°$ C. and $-30°$ C., separating the crystals thereby formed and repeating the foregoing steps for the alternate separation of further quantities of $MgCl_2.12H_2O$ and $CaCl_2.6H_2O$ crystals, respectively.

Signed this 13 day of August, 1928.

CARL F. PRUTTON.